March 6, 1956 W. W. CUSHMAN 2,737,265
AUTOMATIC BRAKES FOR TRAILERS
Filed Nov. 17, 1952 2 Sheets-Sheet 1
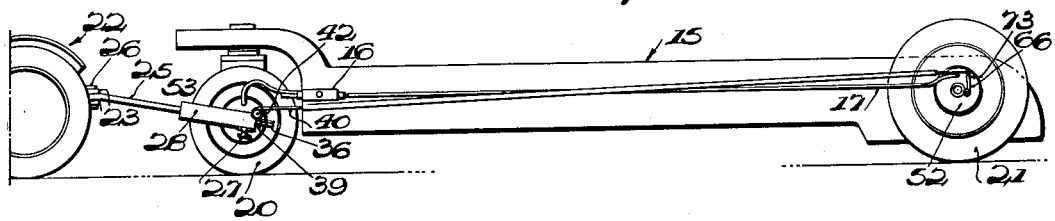
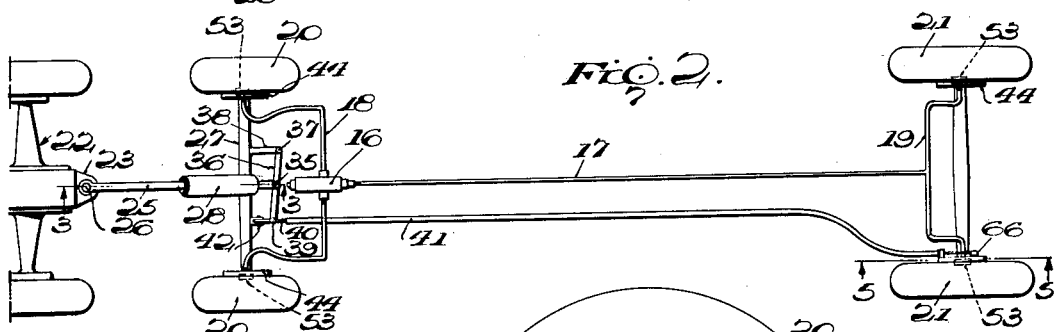
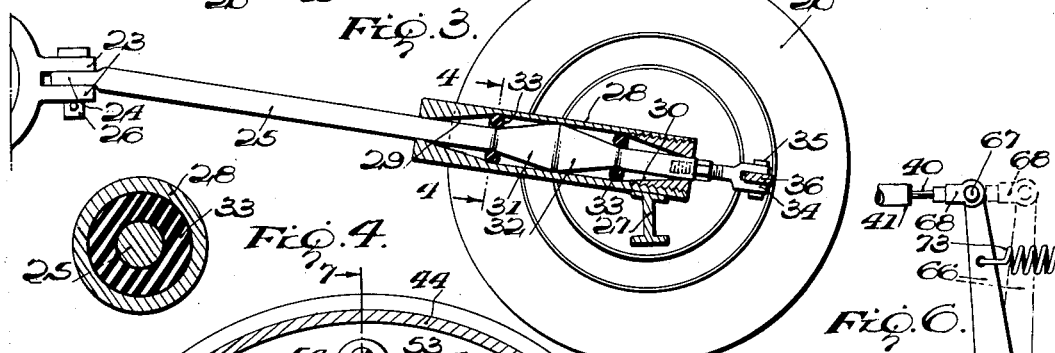
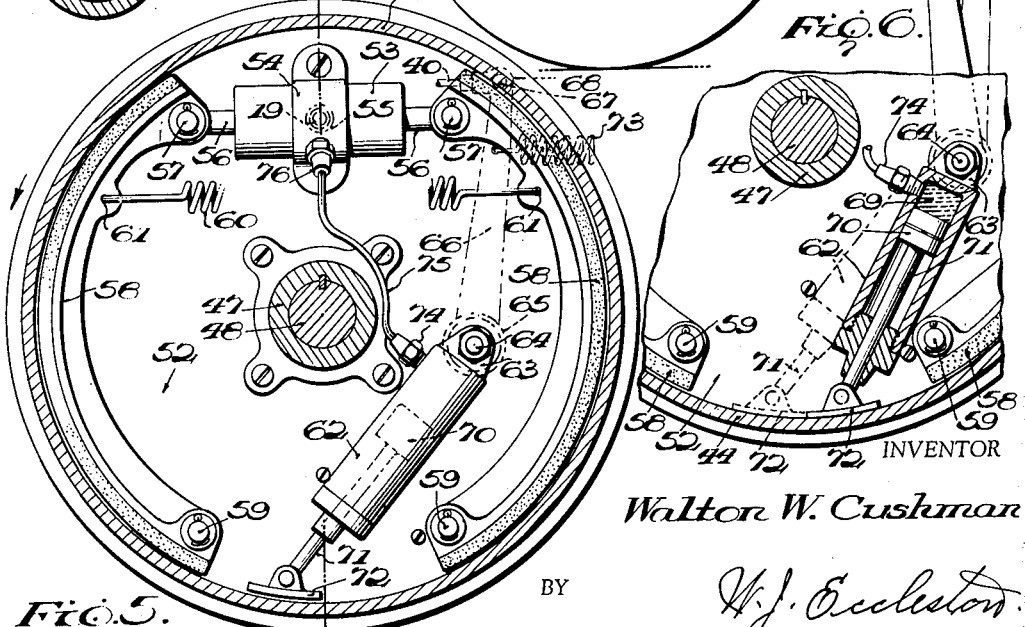
INVENTOR
Walton W. Cushman
BY
W. J. Eccleston
ATTORNEY

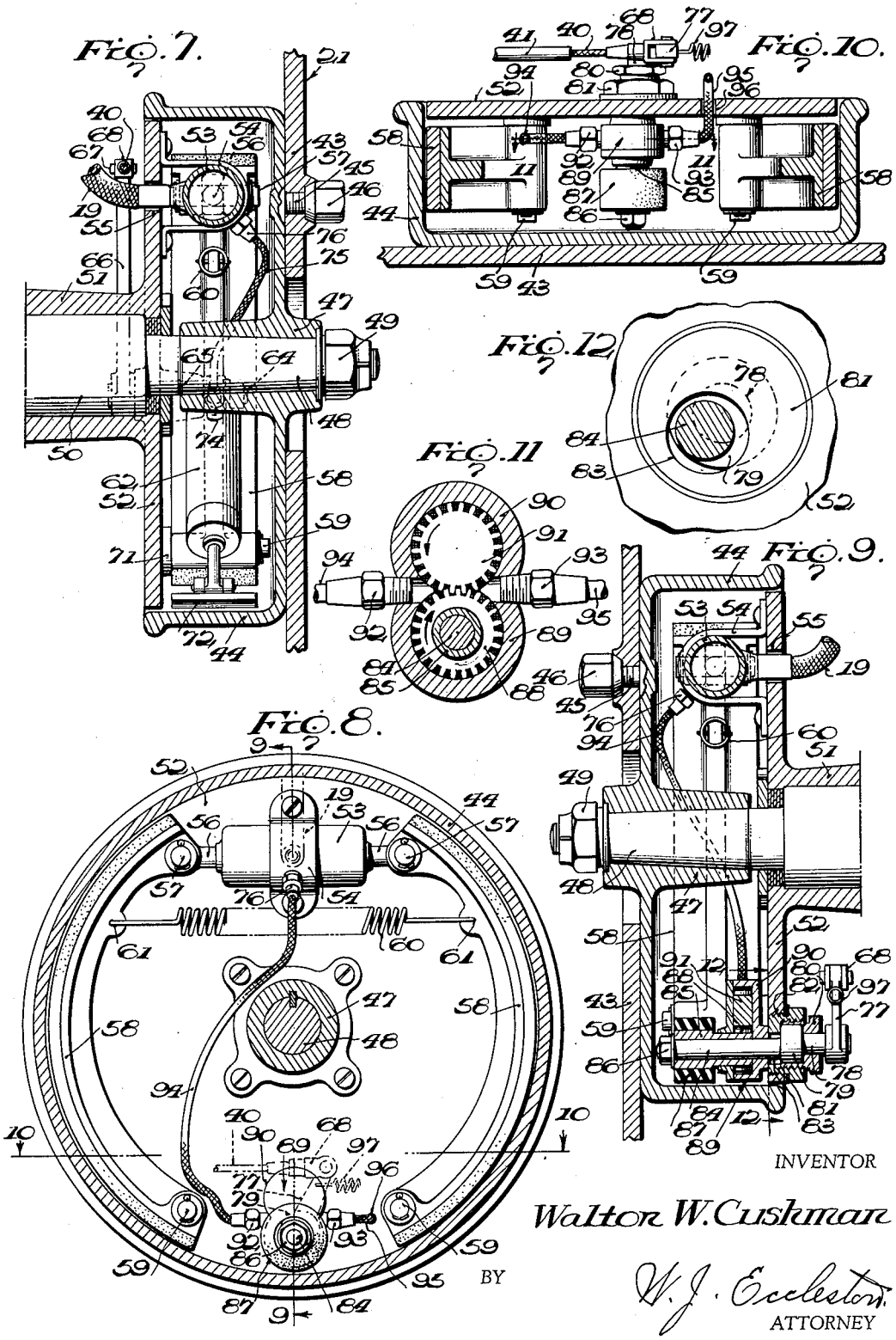

United States Patent Office 2,737,265
Patented Mar. 6, 1956

2,737,265

AUTOMATIC BRAKES FOR TRAILERS

Walton W. Cushman, Webb City, Mo.

Application November 17, 1952, Serial No. 321,065

5 Claims. (Cl. 188—152)

(Granted under Title 35, U. S. Code (1952), sec. 266)

The invention described herein, if patented, may be manufactured and used by or for the Government for governmental purposes, without the payment to me of any royalty thereon.

My invention relates to automatic brakes for trailers.

A primary object of the invention is to provide brakes for heavy trailers and the like which are applied automatically due to relative movement between the trailer and towing vehicle, as when the trailer tends to overrun the towing vehicle on a downgrade or the like.

A further important object is to provide automatic brakes for trailers which are actuated by relative movement of the trailer and tow bar or tongue connecting the trailer and towing vehicle, the automatic brakes preventing "jackknifing" of the trailer and towing vehicle on a downgrade, or when the towing vehicle's brakes are applied, or the like.

A further object is to provide brake operating means for trailers and the like which may be furnished in the form of a kit and applied to existing trailers, and also incorporated in the manufacturing of new trailers and the like.

A still further object of the invention is to provide automatic brakes for trailers, wherein a movable element is shifted into engagement with a rotating wheel part of the trailer, upon relative movement of the trailer and towing vehicle, the movable element then functioning to apply the hydraulic wheel brakes of the trailer.

Another object is to provide automatic trailer brakes which operate independently of the brakes of the towing vehicle.

Still another object is to provide automatic brakes of the abovementioned character which are positive and substantially instantaneous in operation, reliable, and highly compact and simplified in construction.

Other objects and advantages of the invention will be apparent during the course of the following description:

In the accompanying drawings, forming a part of this application, and in which like numerals are employed to designate like parts throughout the same, Figure 1 is a side elevation, partly diagrammatical of a trailer equipped with automatic brakes embodying my invention, Figure 2 is a diagrammatic plan view of the same, Figure 3 is an enlarged fragmentary longitudinal vertical section on line 3—3 of Figure 2, Figure 4 is an enlarged transverse vertical section on line 4—4 of Figure 3, parts omitted, Figure 5 is a greatly enlarged vertical section on line 5—5 of Figure 2, Figure 6 is a fragmentary vertical sectional view, similar to Figure 5 and showing operating elements of the automatic brakes in positions for applying the brakes, Figure 7 is a vertical section on line 7—7 of Figure 5, Figure 8 is a vertical cross section similar to Figure 5, and showing a modified form of automatic brakes, Figure 9 is a vertiical section on line 9—9 of Figure 8, Figure 10 is a horizontal cross section on line 10—10 of Figure 8, Figure 11 is an enlarged vertical section on line 11—11 of Figure 10, and, Figure 12 is an enlarged fragmentary vertical section on line 12—12 of Figure 9.

In the drawings, where for the purpose of illustration are shown preferred embodiments of my invention, attention is directed first to Figures 1 to 7 inclusive, wherein the numeral 15 designates generally a trailer such as a heavy retriever trailer used in military service, and the like. For the purpose of illustration, a four-wheeled trailer has been shown in the drawings, and equipped with a substantially conventional four-wheel hydraulic brake system including a T-coupling or junction block 16, main hydraulic line 17 and branch hydraulic lines 18 and 19 leading to the hydraulic brakes of the front and rear wheels 20 and 21 of the trailer. The brakes of the four wheels 20 and 21 are all hydraulically interconnected through the hydraulic lines 17, 18 and 19, and the junction block 16, and if desired, these elements may form a closed hydraulic system for operation independently of the brakes of the towing vehicle or tractor 22. The brakes of the trailer operate automatically upon relative longitudinal movement of the trailer and tractor, as will be described in detail hereinafter. For the purpose of simplification, it will be assumed during the course of the following description that the four-wheel hydraulic brake system of the trailer 15 is a self-contained closed system which operates independently of the brakes of the tractor 22. It will be seen that the brakes of the trailer 15 are automatically applied whenever relative movement between the trailer and tractor takes place in one direction, while the trailer is moving forwardly, as when the trailer tends to overrun the tractor on a downgrade, or when the brakes of the tractor are applied by the operator, or the like. It will also be seen that the trailer brakes operate substantially instantaneously to slow down the trailer and prevent the trailer from overrunning the tractor or "jackknifing" with the same.

The towing tractor 22 is provided at its rear end with a drawbar or hitch including a pair of superposed apertured lugs 23, receiving between them a forward apertured extension or eye 24 of a longitudinal tow bar or tongue 25, which may be somewhat inclined downwardly toward its rear end, as shown. A hitch pin 26 engages through the apertured lugs 23 and eye 24 for releasably securing the tongue 25 to the tractor 22.

The front axle 27 of the trailer 15 has rigidly mounted thereon at the longitudinal center of the axle a generally horizontal longitudinal sleeve or barrel 28, and this sleeve is arranged at the transverse center of the trailer 15 and on the common longitudinal center line of the trailer and towing tractor. The rear portion of the tongue 25 is received telescopically by the sleeve 28, as shown, and the sleeve 28 has its bore formed to provide forward and rear conical portions 29 and 30 which taper forwardly and rearwardly respectively. Companion forwardly and rearwardly tapered conical enlargements or wedges 31 and 32 are formed integrally upon the tongue 25, within the sleeve 28, and the wedges 31 and 32 are shiftable longitudinally with the tongue toward the relatively stationary tapered shoulders 29 and 30 of the sleeve 28, the tongue 25 being freely slidable longitudinally through the sleeve 28.

In order to cushion the movement of the tongue 25 in both directions relative to the sleeve 28, I arrange annular rings 33 of rubber, synthetic rubber or the like within the sleeve 28 and surrounding the tongue 25 between the tapered shoulders 29 and 30 and the companion tapered wedges 31 and 32, Figure 3. With this arrangement, whenever the tongue 25 shifts longitudinally in either direction within the sleeve 28, the same is cushioned and resiliently brought to a halt by the rubber rings 33 which are gradually compressed between the conically tapered surfaces of the companion tapered elements 29 and 31 and 30 and 32. With this arrangement, as will be seen hereinafter, the automatic brakes of the trailer 15, although substantially instantly applied are never applied with a shock, which might cause locking of the brakes. Likewise, when the towing tractor 22 starts its forward movement and the tongue 25 moves forwardly within the sleeve 28, there is no shock or impact between the tongue and sleeve 28, and the connection between the tractor and trailer is resilient, quiet and smooth acting.

The rear end of the tongue 25 carries an adjustable clevis 34, pivotally connected at 35 with a horizontal cross link 36, extending laterally upon opposite sides of the tongue 25, Figure 2, and having one end pivoted at 37 to a rearwardly projecting horizontal arm 38, in turn rigidly secured to the back of the front axle 27, and spaced beyond one side of the sleeve 28. The other end of the cross link 36 is spaced beyond the other side of the sleeve 28, Figure 2, and is secured at 39 to a Bowden cable or wire 40, operating within an external relatively rigid sheathing 41 of conventional construction. Forwardly of and above its point of attachment at 39 to the cross link 36, the Bowden cable 40 is trained over a sheave 42, rigidly connected with the front axle of the trailer 15. The arrangement is such that the sheave 42 effects a reversal of movement of the Bowden cable 40 as the same moves in response to horizontal swinging movement of the cross link 36. In other words, when the cross link 36 swings rearwardly or counterclockwise, Figure 2, relative to the fixed sleeve 28, the Bowden cable 40 is pulled longitudinally forwardly for automatically setting the brakes of the trailer in a manner to be described. This forward longitudinal movement of the Bowden cable 40 will occur whenever the sleeve 28 moves forwardly relative to the tongue 25, as when the trailer 15 tends to overrun the towing tractor.

As shown in Figures 1 and 2, the Bowden cable including the external sheathing 41 extends longitudinally rearwardly upon the trailer 15 and has its rear end terminating adjacent to the inside of one rear wheel 21. The Bowden cable may be connected with the body or frame of the trailer at spaced points throughout its length by any conventional means, not shown.

As shown in Figures 5 and 7, the rear wheel 21 adjacent to the rear end of the Bowden cable 40 includes a wheel disk or plate 43, arranged outwardly of a cylindrical brake drum 44 of conventional construction and contacting the outer end of the brake drum as shown in Figure 7. The wheel disk 43 is detachably rigidly secured to the brake drum 44 by means of the usual studs 45 and wedge nuts 46. The brake drum 44 is carried by a central hub 47 preferably formed integral therewith and the hub 47 is keyed to the adjacent end of the rear axle 48 and secured thereto by a nut 49. The axle 48 is journaled within a roller bearing 50, secured within the adjacent end of a stationary rear axle housing 51. Formed integral with the end of the stationary axle housing 51 is a circular vertically disposed wheel backing plate 52, the periphery of which is received by the open inner end of the rotatable brake drum 44, Figure 7. This construction constitutes a substantially conventional automotive or truck wheel mounting.

The non-rotatable backing plate 52 of each trailer wheel 20 and 21 has fixedly secured thereto near its top and upon its outer face a horizontal double acting hydraulic brake cylinder 53 of conventional construction, and the cylinder 53 is arranged inside of the rotary brake drum 44, as shown. Each hydraulic brake cylinder 53 is preferably fixedly secured to the backing plate 52 by a U-shaped mounting bracket or strap 54, or the like. Each double-acting brake cylinder 53 is hydraulically connected with one of the hydraulic branch lines 18 or 19, the ends of the branch lines extending through openings 55, formed in the backing plates 52 adjacent to the brake cylinders 53, see Figures 5 and 7. Each hydraulic brake cylinder 53 operates a pair of opposed pistons arranged within it, and in turn operating a pair of opposed piston rods 56, having their outer ends pivotally secured at 57 with the corresponding ends of conventional curved brake shoes 58. The brake shoes 58 extend about the major portion of the circumference of the brake drum 44, and have their other corresponding ends pivotally secured at 59 to the non-rotatable backing plate 52. The two brake shoes 58 of each wheel 20 and 21 are normally held out of frictional engagement with the brake drum 44 by a retractile spring 60, having its opposite ends connected with the shoes 58 near the upper ends of the same, as indicated at 61, Figure 5. The above construction is that of a substantially conventional hydraulic automotive brake, and it should be understood that in the preferred embodiments of the invention shown in the drawings, each of the wheels 20 and 21 is equipped with the conventional hydraulic brake mechanism, thus far described, and the four hydraulic brake mechanisms of the wheels 20 and 21 are hydraulically interconnected through the hydraulic lines 17, 18 and 19, the ends of the branch lines 18 and 19 leading to the hydraulic wheel cylinders 53, as previously stated.

In the form of the invention shown in Figures 1 to 7 inclusive, I mount a hydraulic operating cylinder or booster 62 inside of the brake drum 44 of the rear wheel 21, adjacent to the Bowden cable 40. The booster cylinder 62 is inclined as shown in Figures 5 and 6, and is disposed within the lower portion of the brake drum 44. The upper end of the booster cylinder 62 has an integral apertured lug 63 formed thereon, receiving a bolt 64 or the like, journaled within a bearing 65, preferably formed integrally with the non-rotatable backing plate 52. The bolt 64 extends through the bearing 65 and beyond the inner surface of the backing plate 52, Figure 7, and the inner end of the bolt 64 has the lower end of a vertically swingable operating arm or lever 66 rigidly secured thereto. The apertured lug 63 of the booster cylinder 62 is rigidly secured to the outer end of the bolt 64, and the arrangement is such that vertical swinging movement of the arm 66 will effect a rocking of the bolt 64 within the bearing 65, and also a vertical swinging movement of the booster cylinder 62. The operating arm 66 is arranged near the inner face of the backing plate 52 and parallel therewith, Figure 7, and the upper end of the arm 66 is pivotally connected as at 67 with a clevis 68, in turn secured to the rear end of the Bowden cable 40.

The booster cylinder 62 contains a quantity of hydraulic fluid 69, Figure 6, and a piston 70 is mounted within the cylinder 62 for reciprocation, and connected with a reciprocatory piston rod 71, extending beyond the lower end of the booster cylinder 62 and having a small brake shoe section 72 pivotally secured to its lower end, and disposed between the adjacent lower ends of the brake shoes 58, see Figure 5. The area of the brake drum 44 between the lower ends of the brake shoes 58 is exposed for contact with the small brake shoe section 72, when the automatic trailer brakes are operated. A suitable retractile spring 73 is connected with the operating arm 66 near its upper end, Figure 5, for normally holding the brake shoe section 72 out of engagement with the brake drum 44. The spring 73 may have its opposite end connected with any convenient part of the trailer structure, not shown.

A hydraulic fitting 74 is connected in the side of the booster cylinder 62, above the piston 70 and communicates with the interior of the booster cylinder. A hydraulic line or tube 75 is connected with the fitting 74 and leads at its other end to a fitting 76, connected in the side of the hydraulic brake cylinder 53, between the two pistons of the cylinder 53, Figure 5. The purpose of the line 75 is to hydraulically interconnect the booster cylinder 62 with the brake cylinder 53 of the rear wheel 21 nearest the Bowden cable 40.

In operation, whenever the sleeve 28 of the trailer moves forwardly longitudinally upon the tongue 25, while the trailer 15 is driving forwardly, the brakes will be applied automatically and substantially instantaneously to the four wheels 20 and 21 of the trailer. This relative movement of the sleeve 28 and tongue 25 can occur whenever the trailer 15 tends to overrun the towing tractor 22, as on a downgrade, or when the brakes of the tractor 22 are independently applied. When the sleeve 28 moves forwardly upon the tongue 25, the transverse connecting link 36 will swing rearwardly or counterclockwise in Figure 2, pivoting about its point of connection 37 with the fixed arm 38. This action will pull the Bowden cable 40 longitudinally forwardly in its sheathing 41, due to the reversal of the cable over the sheave 42. When the Bowden cable 40 is pulled forwardly, the operating lever 66 swings counterclockwise, Figures 5 and 6, and the booster cylinder 62 likewise swings counterclockwise and downwardly about the axis of the bolt 64. This shifts the brake shoe section 72 into frictional contact with the interior of the brake drum 44, which is rotating counterclockwise in Figure 5 while the trailer 15 is traveling forwardly. As soon as the brake section 72 frictionally engages the brake drum 44, the piston 70 will be forced upwardly toward the top end of the booster cylinder 62 for compressing the hydraulic fluid 69. This compression of the hydraulic fluid 69 in the booster cylinder will exert sufficient hydraulic pressure on the two pistons of the double-acting cylinder 53, through the medium of the hydraulic line 75, to cause the brake shoes 58 to be shifted into engagement with the brake drum 44. Simultaneously, due to their hydraulic interconnection through the lines 17, 18 and 19, the brakes of all four wheels 20 and 21 will be automatically applied when the booster cylinder 62 operates in response to the movement of the Bowden cable 40 and associated elements, for shifting the brake shoe section 72 into contact with the brake drum 44. When the booster cylinder 62 and associated elements are functioning to fully apply the brakes of the trailer 15, the cylinder 62 and arm 66 may assume the positions shown in Figure 6. As soon as the overrunning movement of the trailer 15 relative to the towing tractor 22 has been checked by the automatic application of the trailer brakes, the sleeve 28 will again move rearwardly, relative to the tongue 25 and the Bowden cable 40 will be released or slackened. When this occurs, the spring 73 will automatically return the arm 66 and booster cylinder 62 to their positions shown in Figure 5, wherein the brake shoe section 72 is held out of engagement with the rotating brake drum.

It is to be noted that the arrangement in no way interferes with backing up of the trailer 15, since when the tractor is reversed for backing up the trailer, the relative movement between the sleeve 28 and tongue 25 which ordinarily causes application of the trailer brakes is now ineffective for applying the brakes. This is true, because the brake drums 44 of the trailer wheels are now turning clockwise, Figure 5, and will not affect the compression of the fluid 69 within the booster cylinder 62, even when the brake shoe section 72 contacts the brake drum. When the trailer is backing up, and the brake drum 44 is turning clockwise, Figure 5, the same will tend to shift the piston 70 downwardly within the booster cylinder 62, rather than upwardly so that the brakes of the trailer are not automatically applied and the backing up of the trailer is not interferred with.

As stated previously, the automatic hydraulic brake system for the trailer 15 may be a self-contained closed system operating entirely independently of the brakes of the tractor 22, as shown.

In Figures 8 to 12 inclusive, there is shown a modified form of the invention, wherein the identical conventional hydraulic brake mechanism including the brake shoes 58, brake cylinder 53, and associated elements shown and described in connection with the first form of the invention are also employed. These conventional hydraulic brake elements are mounted inside of the rotary brake drum 44, and connected with the non-rotatable backing plate 52 of the rear wheel 21, in the identical manner shown and described in connection with the first form of the invention.

In the form of the invention illustrated in Figures 8 to 12, the clevis 68 at the rear end of the Bowden cable 40 is pivotally connected with the upper end of a vertically swingable operating arm or lever 77, corresponding to the lever 66. The lever 77 is arranged inwardly of the non-rotatable backing plate 52, Figure 9, and is disposed near the bottom of the brake drum 44 as shown. The lower end of the lever 77 is rigidly mounted upon one end of a rock shaft 78, including an enlarged portion 79, journaled within a bearing cap or element 80, having screw-threaded engagement with a nut or bushing 81, fixedly mounted within a screw-threaded opening 82, formed in the backing plate 52. The bushing 81 has a clearance opening or bore 83, receiving an extension 84 of the rock shaft 78, which extension is eccentric with respect to the enlarged portion 79 journaled within the bearing 80. The extension 84 extends near the outer closed side of the brake drum 44, Figure 9, and has freely journaled thereon a sleeve 85. A nut 86 on the end of the rock shaft extension 84 adjacent to the outer side of the brake drum prevents axial displacement of the rotatable sleeve 85, as shown. The end portion of the sleeve 85 adjacent to the nut 86 has a cylindrical covering 87 of relatively hard rubber or the like, forming with the sleeve 85 a roller for engagement with the inner annular face of the brake drum 44. The periphery of the rubber roller 87 is preferably parallel with the internal surface of the brake drum 44, and the axis of the rock shaft 78 is parallel with the axis of rotation of the brake drum.

The end of the sleeve 85 remote from the rubber roller 87 carries a gear 88 keyed or otherwise rigidly secured thereto. This gear 88 is rotatable within the lower part of a small gear pump casing 89, which receives the adjacent end of the rotatable sleeve 85 and the rock shaft extension 84, Figure 9. The upper portion 90 of the gear pump casing contains a freely rotatable gear 91, in permanent mesh with the gear 88. Fittings or nipples 92 and 93 are connected with opposite sides of the gear pump casing 89, Figures 8 and 11, and communicate with the interior of the pump casing between the two gears 88 and 91. The fitting 92 of the gear pump casing is connected with a hydraulic line or tube 94, arranged within the brake drum 44 and having its other end leading to and connected with the fitting or nipple 76 of the brake cylinder 53, previously described in connection with the first form of the invention. The opposite fitting 93 of the gear pump casing is connected with a hydraulic line 95, which extends through an opening 96 formed in the backing plate 52, Figure 10. This hydraulic line 95 leads to any suitable source of hydraulic fluid, not shown, which may take the form of a small reservoir or tank mounted upon the trailer 15 at any convenient location. The gear pump casing 89 is maintained filled with hydraulic fluid from the line 95. Since the gear pump casing 89 is connected with the two lines 94 and 95 at opposite sides of the rock shaft 78, the same will not rotate or turn with the sleeve 85, but will be held against rotation by the fittings 92 and 93.

A suitable retractile spring 97 is connected with the operating arm 77 near the upper end of the same, Figure 8, and has one end secured to a stationary part of the tractor 15, not shown. This spring, like spring 73 in the first form of the invention, serves to oppose the action of the Bowden cable 40, and return the operating arm 77 to its position for holding the rubber roller 87 slightly elevated and out of contact with the brake drum 44, Figures 8 and 9.

In the operation of the second form of the invention, when the necessary relative movement between the trailer 15 and tractor 22 takes place, as previously described, the Bowden cable 40 will be pulled longitudinally forwardly for swinging the operating arm 77 forwardly or counterclockwise, Figure 8. When this occurs, the rock shaft 78 will turn within the bearing element 80 and the eccentric rock shaft extension 84 will cause the rubber roller 87 to shift downwardly and engage the internal surface of the brake drum 44. This will instantly cause high speed rotation of the roller 87 and sleeve 85, causing simultaneous rotation of the gears 88 and 91 within the gear pump casing 89. The gears 88 and 91 will now turn in a proper direction, indicated by the arrows in Figure 11 for causing hydraulic fluid to be pumped through the line 94 to the double-acting brake cylinder 53. When the hydraulic pressure in the brake cylinder 53 is increased in this manner, the four-wheel brakes of the trailer 15 will be automatically applied, as previously described in detail in connection with the first form of the invention.

When the brakes have been applied automatically to the trailer 15, and the tendency for the trailer to overrun the tractor 22 has been checked by the brakes, the Bowden cable 40 will become slackened and the spring 97 will return the arm 77 to its position shown in Figure 8, wherein the roller 87 will be automatically lifted from contact with the brake drum 44, and the rotation of the roller and resultant operation of the gear pump will cease, thus effecting automatic releasing of the hydraulic brakes of the trailer 15.

It will be noted as in the first form of the invention, the arrangement permits of backing up the trailer 15 and tractor 22 without application of the trailer brakes, which would render backing up impossible. When the tractor is reversed for backing up the trailer, the same relative movement between the tongue 25 and sleeve 28 for setting the trailer brakes takes place, and the operating arm 77 is operated in the same manner for shifting the roller 87 into engagement with the brake drum 44. However, the brake drum 44 during backing up of the trailer is turning clockwise in Figure 8, and the direction of rotation of the roller 87 caused by the clockwise turning of the brake drum 44 will reverse the direction of rotation of the pump gears 88 and 91. This will cause the gear pump to operate in reverse, tending to create suction in the line 94 for holding the brake shoes 58 in their inactive or released positions, and thereby permitting backing up of the trailer.

The same basic mode of operation is seen to be present in both forms of the invention, and the relative longitudinal movement of the tongue 25 and sleeve 28 causes the Bowden cable 40 to pull the operating arms 66 and 77 forwardly. This action, in both forms of the invention shifts the hydraulic booster means, which in one case is the booster cylinder 62 and the other case is the gear pump, into operative engagement with the rotating brake drum 44, for causing the automatic application of the four-wheel hydraulic brakes of the trailer 15.

It should be understood that my automatic brakes will operate satisfactorily in connection with the four-wheel hydraulic brake system shown in Figure 2, and also in connection with two-wheel or one-wheel hydraulic brakes, if preferred. Also, I do not wish to limit the application of my automatic brake setting means to the particular rear wheel 21 of the trailer 15 adjacent to which the Bowden cable 40 has been extended for the purpose of illustration only, and it should be understood that the brake setting mechanism, including the booster cylinder 62 and associated elements, and the roller 87 and associated elements, may be arranged within the brake drum of any of the four wheels of the trailer 15. To do this, it is merely necessary to extend the Bowden cable 40 adjacent to the selected wheel of the trailer for connection with the operating arms 66 or 77.

I also do not wish to limit the use of my automatic brakes to the particular type of trailer illustrated diagrammatically in the drawings, since the brakes are believed to be applicable to various types of trailers and automotive vehicles which it is desired to equip with automatic brakes.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. In an automatic brake system for vehicles, a rotary brake drum, friction brake means mounted within the brake drum and adapted to engage the same, fluid pressure means to effect engagement of the friction brake means and brake drum, extensible fluid pressure means movably mounted within the brake drum and engageable therewith and operated by rotation of the brake drum to supply fluid pressure to said fluid pressure means, and means connected with the extensible fluid pressure means to move the same into engagement with the rotary brake drum.

2. In an automatic brake system for vehicles, a rotary brake drum, friction brake means mounted within the brake drum and adapted to engage the same, fluid pressure means to effect engagement of the friction brake means with the brake drum, an extensible fluid pressure booster device pivotally mounted within the brake drum and engageable therewith and operated by the rotation of the brake drum to supply fluid pressure to the fluid pressure means, and means connected with the pivoted fluid pressure booster device to swing the same into engagement with the rotary brake drum.

3. In an automatic brake system for vehicles, a rotary brake drum, friction brake means mounted within the brake drum and adapted to engage the same, fluid pressure means connected with the friction brake means to effect engagement of the same with the brake drum, an extensible fluid pressure booster device pivotally mounted within the brake drum and inclined relative to the periphery of the brake drum and engageable therewith, rotation of the brake drum in one direction while in engagement with the inclined booster device operating the booster device to supply fluid pressure to said fluid pressure means, rotation of the brake drum in the other direction while in engagement with the inclined booster device tending to render the booster device inactive, and means connected with the pivoted booster device to shift the same into engagement with the rotary brake drum.

4. In an automatic brake system for vehicles, a rotary brake drum, friction brake means mounted within the brake drum and movable to engage the same, fluid pressure means connected with the friction brake means to effect engagement of the same with the brake drum, a fluid pressure booster cylinder pivotally mounted within the brake drum and inclined with respect to the periphery of the brake drum, a piston mounted within the booster cylinder for reciprocation, an element connected with the piston and engageable with the brake drum, rotation of the brake drum in one direction while engaging said element shifting the piston in a direction whereby the booster cylinder will supply fluid pressure to said fluid pressure means, and means connected with the pivoted booster cylinder for moving the same in a direction causing said element to engage the brake drum.

5. In an automatic brake system for vehicles, a rotary brake drum, friction brake means mounted within the brake drum and adapted to engage the same, fluid pressure means connected with said friction brake and means and adapted to cause engagement of the friction brake means and brake drum, a relatively stationary backing plate, a rock shaft journaled upon the backing plate, a fluid pressure booster cylinder disposed within the brake drum and inclined relative to the periphery thereof and connected with the rock shaft, a piston operable within the booster cylinder to supply fluid pressure to said fluid pressure means, a brake shoe section pivoted to said piston and engageable with the brake drum and adapted to shift the piston within the booster cylinder in a direction causing the cylinder to supply fluid pressure to said fluid pressure means when the brake drum turns in one direction while engaging the brake shoe section, and an operating lever secured to the rock shaft exteriorly of the brake drum for turning the rock shaft in a direction causing said brake shoe section to engage the rotary brake drum.

References Cited in the file of this patent

UNITED STATES PATENTS

| | | |
|---|---|---|
| 1,610,755 | Decker | Dec. 14, 1926 |
| 2,221,929 | Snider | Nov. 19, 1940 |
| 2,477,758 | Majneri | Aug. 2, 1949 |

FOREIGN PATENTS

| | | |
|---|---|---|
| 439,894 | Great Britain | Mar. 19, 1935 |